(12) United States Patent
Suzuki

(10) Patent No.: US 11,168,034 B2
(45) Date of Patent: Nov. 9, 2021

(54) TRAY FOR PRISMATIC HONEYCOMB STRUCTURE

(71) Applicant: NGK INSULATORS, LTD., Nagoya (JP)

(72) Inventor: Michio Suzuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/097,182

(22) Filed: Nov. 13, 2020

(65) Prior Publication Data

US 2021/0284583 A1 Sep. 16, 2021

(30) Foreign Application Priority Data

Mar. 10, 2020 (JP) .............................. JP2020-041279

(51) Int. Cl.
| | | |
|---|---|---|
| B65D 71/70 | (2006.01) | |
| C04B 38/00 | (2006.01) | |
| B01J 35/04 | (2006.01) | |
| B65D 81/02 | (2006.01) | |
| B65D 1/34 | (2006.01) | |
| B65D 77/00 | (2006.01) | |
| B65D 81/133 | (2006.01) | |

(Continued)

(52) U.S. Cl.
CPC ........... *C04B 38/0016* (2013.01); *B01J 35/04* (2013.01); *B65D 1/34* (2013.01); *B65D 71/70* (2013.01); *B65D 77/00* (2013.01); *B65D 81/025* (2013.01); *B65D 81/133* (2013.01); *B65D 85/46* (2013.01); *B01D 53/885* (2013.01); *B01D 2255/9045* (2013.01); *B65D 71/0088* (2013.01); *B65D 2585/86* (2013.01); *C04B 2111/00793* (2013.01)

(58) Field of Classification Search
CPC .... B65D 71/70; B65D 81/025; B65D 81/133; B65D 85/46; B65D 71/0088; B65D 2585/86
USPC ........ 206/557, 564, 565, 521, 587, 593, 594
See application file for complete search history.

(56) References Cited

U.S. PATENT DOCUMENTS

| | | | | |
|---|---|---|---|---|
| 5,765,687 A | * | 6/1998 | Matsubara ........... | B65D 5/5038 206/521 |
| 2005/0121358 A1 | * | 6/2005 | Andre .................. | B65D 88/123 206/600 |

(Continued)

FOREIGN PATENT DOCUMENTS

| | | |
|---|---|---|
| JP | 3005187 B2 | 1/2000 |
| JP | 2008-037469 A1 | 2/2008 |
| JP | 2011-136758 A1 | 7/2011 |

*Primary Examiner* — Jacob K Ackun
(74) *Attorney, Agent, or Firm* — Burr & Brown, PLLC

(57) ABSTRACT

A tray including a plate-shaped portion for arranging a plurality of prismatic honeycomb structures having an outer peripheral side surface and partition walls provided on an inner peripheral side of the outer peripheral side surface, the partition walls partitioning a plurality of cells forming flow paths from a first end surface to a second end surface, the plate-shaped portion including: a plurality of corrugated plate-shaped placing portions for placing the prismatic honeycomb structures with the outer peripheral side surface in contact with the placing portions; flat plate-shaped non-placing portions adjacent to each of the corrugated plate-shaped placing portions; and partition walls erected between adjacent corrugated plate-shaped placing portions to prevent the outer peripheral side surfaces of adjacent prismatic honeycomb structures from contacting each other.

10 Claims, 9 Drawing Sheets

(51) Int. Cl.
  *B65D 85/46* (2006.01)
  *B01D 53/88* (2006.01)
  *C04B 111/00* (2006.01)
  *B65D 71/00* (2006.01)

(56) References Cited

U.S. PATENT DOCUMENTS

| | | | |
|---|---|---|---|
| 2007/0193912 A1* | 8/2007 | Shiraki | ................ B65D 81/113 |
| | | | 206/503 |
| 2008/0035517 A1 | 2/2008 | Shiraki et al. | |
| 2009/0288976 A1* | 11/2009 | Shiraki | .............. B65D 71/0096 |
| | | | 206/386 |

* cited by examiner

Enlarged view of portion surrounded by thick line X

A-A line end view

B-B line end view

TRAY FOR PRISMATIC HONEYCOMB STRUCTURE

FIELD OF THE INVENTION

The present invention relates to a tray that can be used for packing, storing, or transporting a plurality of prismatic honeycomb structures.

BACKGROUND OF THE INVENTION

Exhaust gas emitted from internal combustion engines represented by automobile engines includes pollutants, for example, particulate matter (PM) such as soot, nitrogen oxides (NOx), soluble organic fractions (SOF), hydrocarbons (HC), and carbon monoxide(CO). For this reason, conventionally, a honeycomb structure having a pillar-shaped honeycomb structure carrying an appropriate catalyst (oxidation catalyst, reduction catalyst, three-way catalyst, etc.) according to a pollutant has been often used in the exhaust gas system of an internal combustion engine.

When such a honeycomb structure is shipped as a product, operations such as packing, storing, and transporting a plurality of honeycomb structures are performed. However, since the honeycomb structure is mainly made of ceramics, which is a brittle material, there is a problem that the honeycomb structure is easily damaged by colliding with each other due to shaking caused by the operations. For this reason, conventionally, trays and packing boxes suitable for packing, transporting and storing a plurality of honeycomb structures have been proposed.

Patent Literature 1 (Japanese Patent No. 3005187) aims to propose a packing means that is easy to handle, stable against vibration during transportation, and low in cost, and there is proposed a packaging box for honeycomb-shaped structures including an outer box and a holding plate for the honeycomb-shaped structures arranged in the outer box.

Patent Literature 2 (Japanese Patent Application Publication No. 2008-37469) discloses a tray comprising one or more pockets in the shape of a plate to accommodate an end surface side of a brittle pillar-shaped body, and rising portions at portions other than the corners of the pocket where the bottom surfaces and the side surfaces forming the pocket contact, on each of the bottom surfaces and the side surfaces. According to this tray, it is possible to prevent the edge portion of the product having a pillar shape made of a brittle material which is easily broken from being damaged.

Patent Literature 3 (Japanese Patent Application Publication No. 2011-136758) discloses a tray used for packing a plurality of pillar-shaped honeycomb structures together, composed of a plurality of dish-shaped sheets with predetermined compressive strength and recesses in which an end of a honeycomb structure fit, and a base that has a plate shape and has a plurality of recesses in which the sheet is fitted on at least one side of the base. It is alleged that this tray can effectively prevent damage to the honeycomb structure due to vibration during transportation, and honeycomb structures can be packed at low cost and with good workability without using many members.

CITATION LIST

Patent Literature

[Patent Literature 1] Japanese Patent No. 3005187
[Patent Literature 2] Japanese Patent Application Publication No. 2008-37469
[Patent Literature 3] Japanese Patent Application Publication No. 2011-136758

SUMMARY OF THE INVENTION

The trays described in the background art are considered suitable for packing, transporting or storing cylindrical honeycomb structures. However, since honeycomb structures sometimes have prismatic shape, it is desirable to develop a tray suitable for packing, transporting, or storing prismatic honeycomb structures.

The present invention has been created in view of the above circumstances, and, in one embodiment, an object of the present invention is to provide a tray suitable for packing, transporting, or storing prismatic honeycomb structures. Further, in another embodiment, an object of the present invention is to provide a package of prismatic honeycomb structures using such a tray.

In order to solve the above problems, the present inventors first considered using a tray provided with intervening walls so that the prismatic honeycomb structures are not damaged by collision during transportation when they are stored. However, a tray is generally made of resin and has a weak function as a cushioning material. Therefore, there is a problem that the prismatic honeycomb structures are damaged when the prismatic honeycomb structures are stacked in multiple stages via the tray. In particular, although the prismatic honeycomb structure itself has sufficiently high compressive strength, the edges forming the contours of both end surfaces are easily damaged, so it has been difficult to stack in a large number of stages.

Accordingly, it is conceivable to put the tray on which the prismatic honeycomb structures 10 are placed in a container box 230 and stack the container boxes 230 to form a package 200 (see FIG. 10). However, using a container box caused a problem that the management cost gets higher due to the increase in packing members and that the loading efficiency per area is impaired. Further, when manufacturing a joint product in which a plurality of prismatic honeycomb structures is combined, it may be necessary to automatically load the prismatic honeycomb structures into a facility in the intermediate process using an industrial robot or the like. If container boxes are used, a mechanism to transport each of the container boxes are required at the time of automatic loading into the facility, causing a problem that the mechanical device becomes large and complicated, and that the frequency of pallet replacement increases due to low loading efficiency.

Based on the above problems, the present inventor continuously and diligently studied the tray structure advantageous for solving the above problems and then devised a tray structure that can be easily stacked without applying a load to the edges forming the contours of both end surfaces of the prismatic honeycomb structure, and achieved the present invention exemplified as below.

[1]

A tray comprising a plate-shaped portion for arranging a plurality of prismatic honeycomb structures having an outer peripheral side surface and partition walls provided on an inner peripheral side of the outer peripheral side surface, the partition walls partitioning a plurality of cells forming flow paths from a first end surface to a second end surface, the plate-shaped portion comprising:

a plurality of corrugated plate-shaped placing portions for placing the prismatic honeycomb structures with the outer peripheral side surface in contact with the placing portions;

flat plate-shaped non-placing portions adjacent to each of the corrugated plate-shaped placing portions; and intervening walls erected between adjacent corrugated plate-shaped placing portions to prevent the outer peripheral side surfaces of adjacent prismatic honeycomb structures from contacting each other;

wherein each of the corrugated plate-shaped placing portions comprises a plurality of mountain portions protruding above an upper surface of the adjacent flat plate-shaped non-placing portion and a plurality of valley portions protruding below a lower surface of the adjacent flat plate-shaped non-placing portion, alternately, and a length between both ends of the mountain portions of each corrugated plate-shaped placing portion in a width direction of the intervening wall is shorter than a distance from the first end surface to the second end surface of the prismatic honeycomb structure, and a length between both ends of the valley portions of each corrugated plate-shaped placing portion in the width direction of the intervening wall is shorter than the distance between the first end surface to the second end surface of the prismatic honeycomb structure.

[2]

The tray according to [1], wherein the length between the both ends of the mountain portions of each corrugated plate-shaped placing portion in the width direction of the intervening wall is 50% to 95% with respect to the distance from the first end surface to the second end surface of the prismatic honeycomb structure.

[3]

The tray according to [1] or [2], wherein the length between the both ends of the valley portions of each corrugated plate-shaped placing portion in the width direction of the intervening wall is 50% to 95% with respect to the distance from the first end surface to the second end surface of the prismatic honeycomb structure.

[4]

The tray according to any one of [1] to [3], wherein each corrugated plate-shaped placing portion has a rectangular wave cross-section.

[5]

The tray according to any one of [1] to [4], wherein a height of the mountain portion with respect to the upper surface of the flat plate-shaped non-placing portion is lower than a height of the intervening wall with respect to the upper surface of the flat plate-shaped non-placing portion.

[6]

The tray according to any one of [1] to [5] comprising at least one material selected from polypropylene, polyethylene, polyethylene terephthalate, vinyl chloride, iron, aluminum, and paper.

[7]

The tray according to any one of [1] to [6], wherein in each corrugated plate-shaped placing portion, a height of the mountain portion with respect to the upper surface of the adjacent flat plate-shaped non-placing portion and a depth of the valley portion with respect to the lower surface of the adjacent flat plate-shaped non-placing portion are the same.

[8]

A package of prismatic honeycomb structures, comprising a first array of a plurality of prismatic honeycomb structures placed on top of a first tray;

a second tray placed on top of the first array; and a second array of a plurality of prismatic honeycomb structures placed on top of the second tray;

wherein the first tray and the second try are the tray according to any one of [1] to [7], respectively.

[9]

The package of prismatic honeycomb structures according to [8], comprising a pallet placed under the first tray.

[10]

The package of prismatic honeycomb structures according to [8] or [9], comprising a cushion sandwiched between the first array and the second tray.

When prismatic honeycomb structures are stacked via the tray according to one embodiment of the present invention, the prismatic honeycomb structures arranged above and below the tray are not subject to a load on the edges forming the contours of both end surfaces. Therefore, the risk of damaging the prismatic honeycomb structures is reduced, and a large number of stages can be stacked. Therefore, it is possible to load the prismatic honeycomb structures in multiple stages via the tray without using a container box.

DETAILED DESCRIPTION OF THE INVENTION

Hereinafter, embodiments of the present invention will be described in detail with reference to the drawings. It should be understood that the present invention is not limited to the following embodiments, and any change, improvement or the like of the design may be appropriately added based on ordinary knowledge of those skilled in the art without departing from the spirit of the present invention.

1. Prismatic Honeycomb Structure

The tray according to the present invention is suitable for packing, transporting or storing prismatic honeycomb structures. The prismatic honeycomb structures may be used, for example, as a DPF (Diesel Particulate Filter) and a GPF (Gasoline Particulate Filter) that collect soot and is attached on an exhaust gas line from a combustion device, typically an engine mounted on a vehicle.

Figure 1:
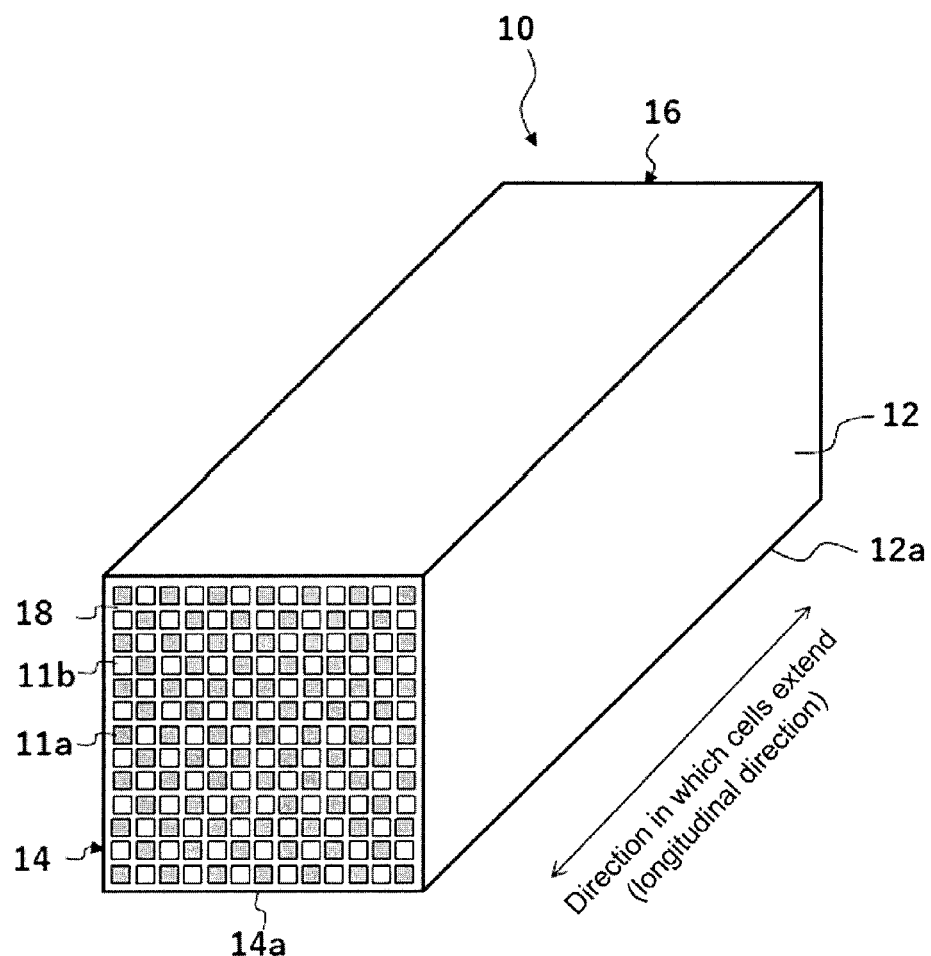
FIG. 1 is a schematic perspective view of a prismatic honeycomb structure according to one embodiment.

FIG. 1 shows a schematic perspective view of the prismatic honeycomb structure 10 according to one embodiment. The prismatic honeycomb structure 10 comprises an outer peripheral side surface 12 and porous partition walls 18 provided on an inner peripheral side of the outer peripheral side surface 12, the partition walls 18 partitioning a plurality of cells 11*a*, 11*b* forming flow paths from a first end surface 14 to a second end surface 16. The cells 11*a* and 11*b* each may penetrate from the first end surface 14 to the second end surface 16 by opening both the first end surface 14 and the second end surface 16. However, in order to improve the PM collection performance, the prismatic honeycomb structure 10 preferably comprises a plurality of first cells 11*a* extending from the first end surface 14 to the second end surface 16, open on the first end surface 14 and sealed on the second end surface 16, and a plurality of second cells 11*b* extending from the first end surface 14 to the second end surface 16, sealed on the first end surface 16 and open on the second end surface 14. They can be arranged alternately adjacent to each other with partition walls interposed therebetween so that both end surfaces have a checkered pattern.

Such a prismatic honeycomb structure itself can have a product shape. Alternatively, a plurality of prismatic honeycomb structures may be used as segments to be joined to form a product shape as a segment joint body. By providing them as a segment joint body, thermal shock resistance can be enhanced. The segment joint body can have an outer peripheral wall formed by grinding the outer peripheral portion to form a desired shape (for example, a cylindrical shape), applying a coating material to an outer peripheral side surface, and then drying and heat-treating.

The prismatic honeycomb structure shown is a quadrangular prism with a square end surface shape. In addition, a polygonal prismatic honeycomb structure having an end surface shape such as a triangle, a quadrangle (such as a rectangle), or a hexagon can also be packed, transported, or stored using the tray according to the present invention.

The material of the prismatic honeycomb structure is not particularly limited but is typically made of porous ceramics. Examples of ceramics include cordierite, mullite, zirconium phosphate, aluminum titanate, silicon carbide, silicon-silicon carbide composite, cordierite-silicon carbide composite, zirconia, spinel, indialite, sapphirine, corundum, titania, and the like. In addition, for these ceramics, one type may be contained alone, or two or more types may be contained at the same time.

2. Tray According to Embodiments of the Present Invention

Figure 2:
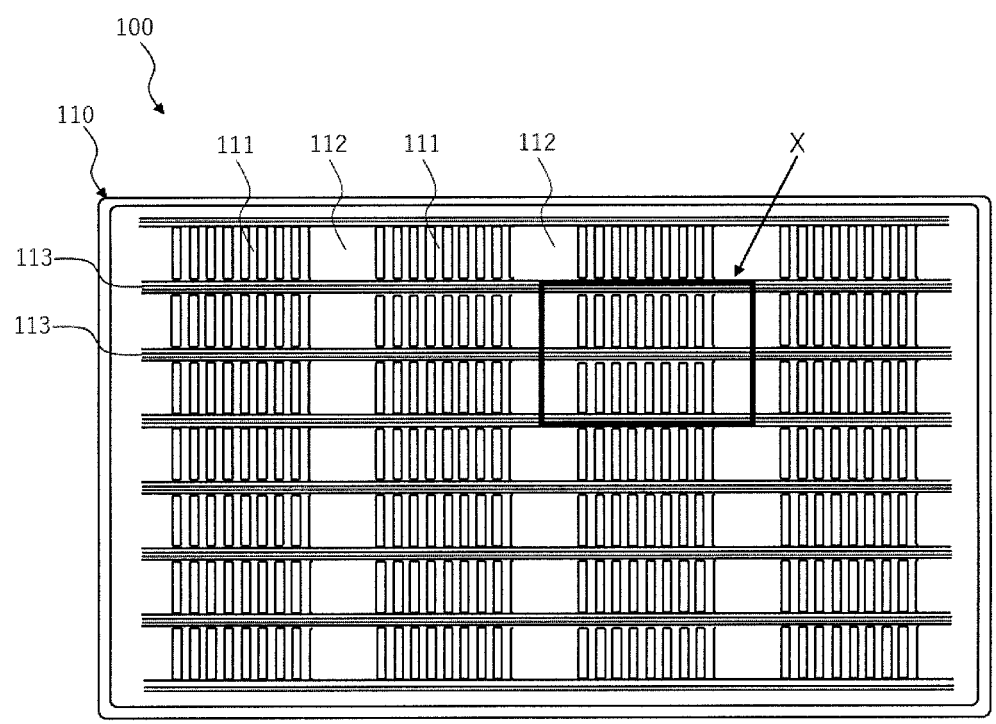
FIG. 2 is a schematic plan view of a tray according to one embodiment of the present invention.
Figure 3A:
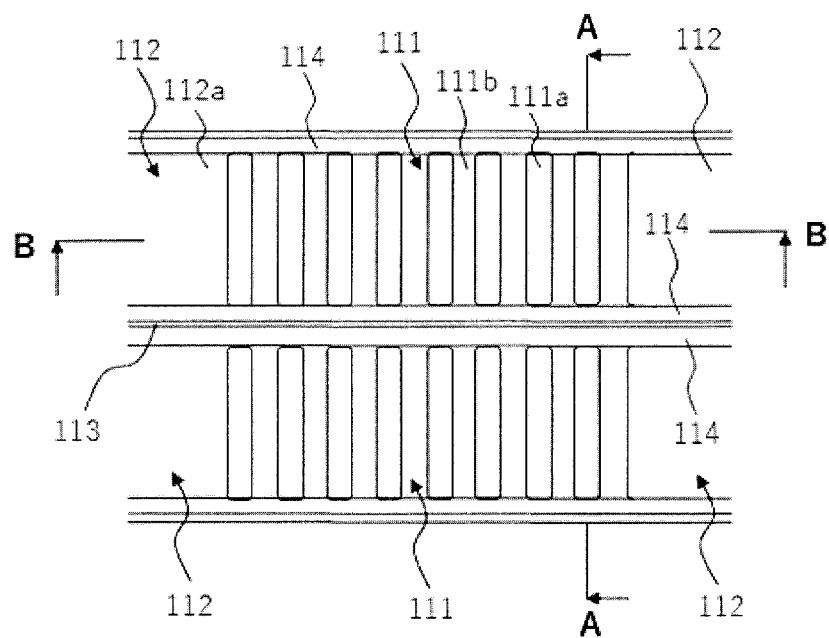
FIG. 3A is an enlarged view of a portion of the tray shown in FIG. 2 surrounded by the thick line frame X.
Figure 3B:
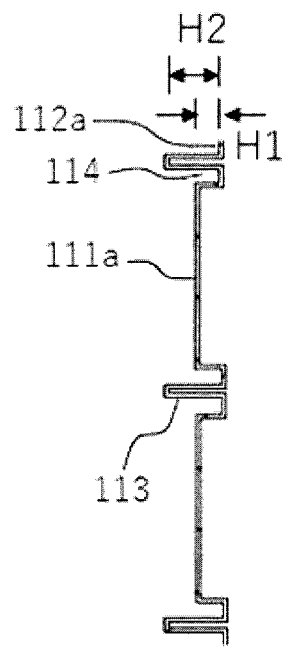
FIG. 3B is an end view taken along line A-A of the enlarged view.
Figure 3C:
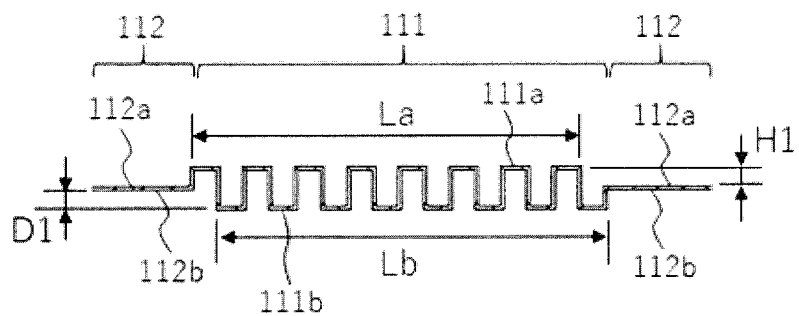
FIG. 3C is an end view taken along line B-B of the enlarged view.

FIG. 2 shows a schematic plan view of a tray 100 according to one embodiment of the present invention. FIG. 3A shows an enlarged view of the portion of the tray 100 shown in FIG. 2 surrounded by the thick line frame X. Further, FIG. 3B shows an end view taken along line A-A of the enlarged view and FIG. 3C shows an end view taken along line B-B in the enlarged view.

The tray 100 comprises a plate-shaped portion 110 for arranging a plurality of prismatic honeycomb structures. the plate-shaped portion 110 comprises a plurality of corrugated plate-shaped placing portions 111 for placing the prismatic honeycomb structures with the outer peripheral side surface in contact with the placing portions;

flat plate-shaped non-placing portions 112 adjacent to each of the corrugated plate-shaped placing portions 111; and intervening walls 113 erected between adjacent corrugated plate-shaped placing portions 111 to prevent the outer peripheral side surfaces of adjacent prismatic honeycomb structures from contacting each other.

Considering the loading efficiency, it is preferable that a plurality of corrugated plate-shaped placing portions 111 be aligned in the vertical direction and the horizontal direction, respectively. Referring to FIG. 2, a plurality of intervening walls 113 extending linearly in the horizontal direction are arranged at equal intervals and parallel to each other in the vertical direction. In addition, between the parallel intervening walls 113 facing each other, a plurality of corrugated plate-shaped placing portions 111 are arranged at equal intervals in the horizontal direction with the flat plate-shaped non-placing portions 112 interposed therebetween. Further, the plurality of corrugated plate-shaped placing portions 111 are arranged at equal intervals in the vertical direction with the intervening walls 113 interposed therebetween. In the illustrated embodiment, four corrugated plate-shaped placing portions 111 are arranged in the horizontal direction and seven corrugated plate-shaped placing portions 111 are arranged in the vertical direction. Therefore, the tray 100 can place 28 prismatic honeycomb structures.

The lower limit of the number of the corrugated plate-shaped placing portions 111 in one tray is not particularly limited, but considering the stability of loading, it is preferable that the corrugated plate-shaped placing portions 111 exist at four or more locations, more preferably six or more locations, and even more preferably eight or more locations. There is no particular limitation on the upper limit of the number of the corrugated plate-shaped placing portions 111 in one tray, and the required number may be appropriately provided.

Referring to FIG. 3, each corrugated plate-shaped placing portion 111 comprises a plurality of mountain portions 111*a* protruding above the upper surface 112*a* of the adjacent flat plate-shaped non-placing portion 112, and a plurality of valley portions 111*b* protruding below a lower surface 112*b* of the adjacent flat plate-shaped non-placing portion 112, alternately. Further, the length La between both ends of the mountain portions 111*a* of each corrugated plate-shaped placing portion 111 in a width direction of the intervening wall 113 (the longitudinal direction of intervening wall 113 in a plan view) is shorter than a distance from the first end surface 14 to the second end surface 16 of the prismatic honeycomb structure 10 (the length of prismatic honeycomb structure in the longitudinal direction), and the length Lb between both ends of the valley portions 111b of each corrugated plate-shaped placing portion 111 in the width direction of the intervening wall 113 is shorter than a distance between the first end surface 14 to the second end surface 16 of the prismatic honeycomb structure 10 (the length of prismatic honeycomb structure in the longitudinal direction).

Further, the height H1 of the mountain portion 111a with respect to the upper surface 112a of the flat plate-shaped non-placing portion 112 is preferably lower than the height H2 of the intervening wall 113 with respect to the upper surface 112a of the flat plate-shaped non-placing portion 112. With this configuration, it is possible to effectively prevent the outer peripheral side surfaces 12 of the adjacent prismatic honeycomb structures 10 from overcoming the intervening wall 113 and colliding with each other. The difference between the height H2 and the height H1 (H2−H1) is preferably 10% or more, more preferably 20% or more, and even more preferably 30% or more with respect to the length of the prismatic honeycomb structure 10 in the vertical direction (stacking direction) when the prismatic honeycomb structure 10 is placed on the tray 100 so that the outer peripheral side surface 12 is in contact with the tray. However, if H2−H1 is too long, the intervening wall 113 becomes an obstacle when stacking the prismatic honeycomb structures 10, so the difference between the height H2 and the height H1 (H2−H1) is preferably 90% or less, more preferably 80% or less, and even more preferably 70% or less with respect to the length of the prismatic honeycomb structure 10 in the vertical direction (stacking direction) when the prismatic honeycomb structure 10 is placed on the tray 100 so that the outer peripheral side surface 12 is in contact with the tray.

In each corrugated plate-shaped placing portion 111, the height H1 of the mountain portion 111a with respect to the upper surface 112a of the adjacent flat plate-shaped non-placing portion 112 and depth D1 of the valley portion 111b with respect to the lower surface 112b of the adjacent flat plate-shaped non-placing portion 112 preferably satisfy 0.9≤H1/D1≤1.1, and more preferably are equal (H1/D1=1.0). As a result, when the prismatic honeycomb structures 10 are stacked vertically via the tray 100, the risk of the tray 100 coming into contact with the edges 14a and 16a of the prismatic honeycomb structure 10 on the upper side and the risk of the tray 100 coming into contact with the edges 14a and 16a of the prismatic honeycomb structure 10 on the lower side can be reduced to the same extent.

It is desirable that the height H1 of the mountain portion 111a and the length La between the two ends of the mountain portions 111a of the corrugated plate-shaped placing portion 111 satisfy 0.01≤H1/La≤0.03, and it is more preferable to satisfy 0.012≤H1/La≤0.024. Thereby, the risk of contact due to the strain of the tray 100 generated when the prismatic honeycomb structures 10 are stacked can be reduced.

Similarly, it is desirable that the depth D1 of the valley portion 111b and the length Lb between the two ends of the valley portions 111b of the corrugated plate-shaped placing portion 111 satisfy 0.01≤D1/Lb≤0.03, and it is more preferable to satisfy 0.012≤D1/Lb≤0.024. Thereby, the risk of contact due to the strain of the tray 100 generated when the prismatic honeycomb structures 10 are stacked can be reduced.

Figure 4A:
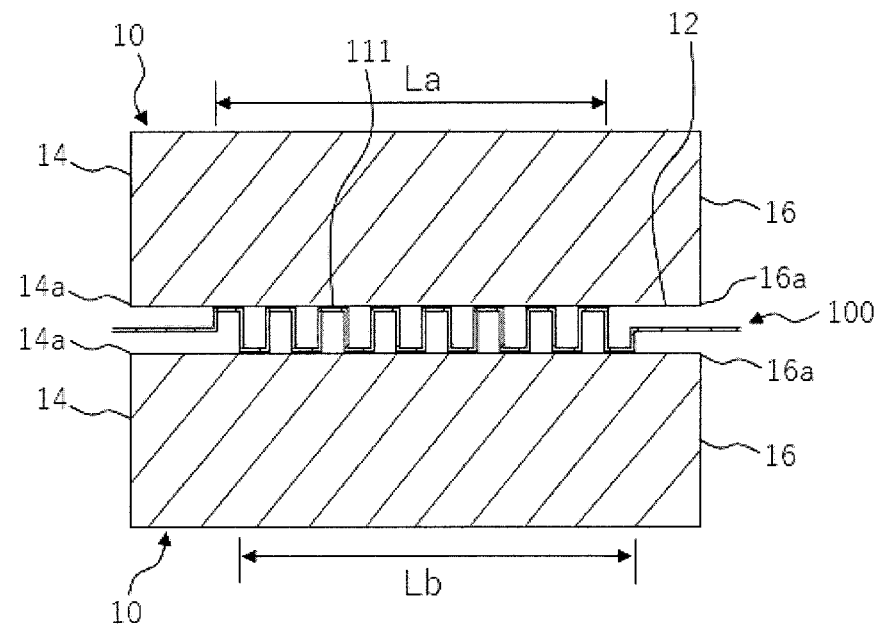
FIG. 4A is a schematic view of a state in which prismatic honeycomb structures are stacked via a tray according to one embodiment of the present invention, as viewed from the end face taken along line B-B.

FIG. 4A is a schematic view of a state in which the prismatic honeycomb structures are stacked via the tray 100 when viewed from the end face of the B-B line. Referring to FIG. 4A, with the above configuration of the plate-shaped portions 110, when the prismatic honeycomb structures 10 are placed on the corrugated plate-shaped placing portions 111 so that the width direction of the intervening walls 113 and the longitudinal direction of the prismatic honeycomb structures coincide with each other, the edges 14a and 16a forming the contours of the first end surface 14 and the second end surface 16 of the prismatic honeycomb structure 10 can be brought into a non-contact state with the tray 100. Further, when the corrugated plate-shaped placing portion 111 is placed on the prismatic honeycomb structure 10, the edges 14a and 16a forming the contours of the first end surface 14 and the second end surface 16 of the prismatic honeycomb structure 10 can be brought into a non-contact state with the tray 100. That is, when the prismatic honeycomb structures are stacked via the tray according to the present embodiment, the prismatic honeycomb structures arranged above and below each tray can be prevented from being applied a load from the tray to the edges forming the contours of both end surfaces. Therefore, when the prismatic honeycomb structures are stacked via the tray 100, the risk of damage to the prismatic honeycomb structures can be significantly reduced.

The length La between two ends of the mountain portions 111a of each corrugated plate-shaped placing portion 111 in the width direction of the intervening wall 113 is preferably a length 50% or more, more preferably 60% or more with respect the distance from the first end surface 14 to the second end surface 16 of the prismatic honeycomb structure 10, from the viewpoint of improving the stability when the prismatic honeycomb structure 10 is placed on the tray 100. In addition, the length La between two ends of the mountain portions 111a of each corrugated plate-shaped placing portion 111 in the width direction of the intervening wall 113 is preferably a length 95% or less, more preferably 90% or less, and even more preferably 80% or less with respect the distance from the first end surface 14 to the second end surface 16 of the prismatic honeycomb structure 10, from the viewpoint of preventing the edges 14a and 16a of the prismatic honeycomb structure 10 from coming into contact with the tray 100 when the prismatic honeycomb structure 10 is placed on the tray 100.

Similarly, the length Lb between two ends of the valley portions 111b of each corrugated plate-shaped placing portion 111 in the width direction of the intervening wall 113 is preferably a length 50% or more, more preferably 60% or more with respect the distance from the first end surface 14 to the second end surface 16 of the prismatic honeycomb structure 10, from the viewpoint of improving the stability when the prismatic honeycomb structure 10 is placed on the tray 100. In addition, the length Lb between two ends of the valley portions 111b of each corrugated plate-shaped placing portion 111 in the width direction of the intervening wall 113 is preferably a length 95% or less, more preferably 90% or less, and even more preferably 80% or less with respect the distance from the first end surface 14 to the second end surface 16 of the prismatic honeycomb structure 10, from the viewpoint of preventing the edges 14a and 16a of the prismatic honeycomb structure 10 from coming into contact with the tray 100 when the prismatic honeycomb structure 10 is placed on the tray 100.

Figure 4B:
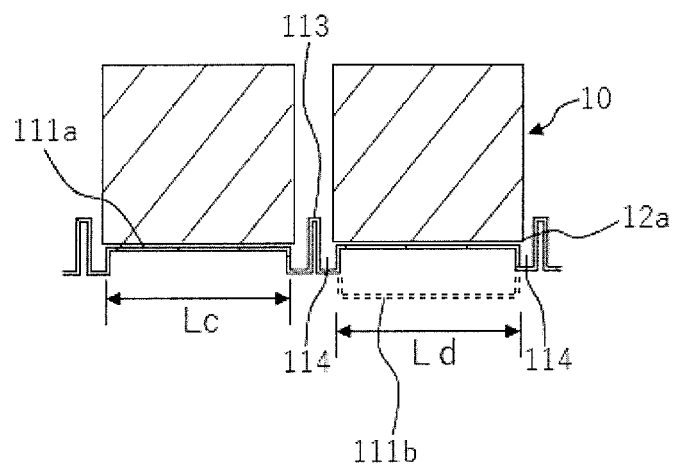
FIG. 4B is a schematic view of a state in which prismatic honeycomb structures are placed on a tray according to one embodiment of the present invention, as viewed from the end face taken along line A-A.

From the viewpoint of making the prismatic honeycomb structure 10 more difficult to break, it is preferable that the corner portions 12a extending in the longitudinal direction of the prismatic honeycomb structure 10 are also stacked without being applied a load from the tray 100. FIG. 4B is a schematic view of a state when the prismatic honeycomb structure 10 is placed on the tray 100 as viewed from the end face of the A-A line. In FIG. 4B, for the purpose of explanation, the valley portion 111b of the corrugated plate-shaped placing portion 111 is shown by a virtual line.

Referring to FIG. 4B, a groove 114 extending in the width direction of the intervening wall 113 is provided between the corrugated plate-shaped placing portion 111 and the intervening wall 113. Further, a length Lc between the two ends of the mountain portions 111a of each corrugated plate-shaped placing portion 111 in the thickness direction of the intervening wall 113 (the direction perpendicular to the extending direction of the intervening wall 113 when viewed in a plan view) is shorter than the length of one side of the end surfaces 14 and 16 of the prismatic honeycomb structure 10 on the side in contact with the mountain portion 111a. Further, the length Ld between the two ends of the valley portions 111b of each corrugated plate-shaped placing portion 111 in the thickness direction of the intervening wall 113 is shorter than the length of one side of the end surfaces 14 and 16 of the prismatic honeycomb structure 10 on the side in contact with the valley portion 111b.

With the above configuration of the tray 100 having the groove 114, when the prismatic honeycomb structures 10 are placed on the corrugated plate-shaped placing portions 111 so that the width direction of the intervening walls 113 and the longitudinal direction of the prismatic honeycomb structures coincide with each other, the corner portion 12a extending in the longitudinal direction of the prismatic honeycomb structure 10 can be brought into a non-contact state with the tray 100. Further, when the corrugated plate-shaped placing portion 111 is placed on the prismatic honeycomb structure 10, the corner portion 12a extending in the longitudinal direction of the prismatic honeycomb structure 10 can be brought into a non-contact state with the tray 100. That is, when the prismatic honeycomb structures are stacked via the tray according to the present embodiment, the prismatic honeycomb structures arranged in contact with each other above and below each tray can be prevented from being applied a load on the corner portion 12a extending in the longitudinal direction.

Therefore, when the tray 100 according to the present embodiment is used, the prismatic honeycomb structures 10 can be stacked without applying a load to any of the edge portions 14a, 16a, and the corner portions 12a, and the number of the honeycomb structures that can be loaded per placing area can be maximized within the allowable range of the compressive strength of the honeycomb structure 10.

The waveform of the corrugated plate-shaped placing portion 111 is not particularly limited, and examples thereof include a wave composed of a curved line such as a sine wave and a wave composed of a broken line such as a triangular wave and a rectangular wave. From the viewpoint of increasing the contact area with the outer peripheral side surface 12 of the prismatic honeycomb structure 10 and reducing the load applied to the prismatic honeycomb structure 10 when the prismatic honeycomb structure 10 is placed on the corrugated plate-shaped placing portion 111, the corrugated plate-shaped placing portion 111 preferably has a rectangular wave cross-section like the tray 100 according to the present embodiment.

The mountain portions 111a and valley portions 111b of each corrugated plate-shaped placing portion 111 are preferably repeatedly formed at equal intervals so that the load on the vertically loaded prismatic honeycomb structures 10 gets even. Further, from the viewpoint of evener distribution of pressure and from the viewpoint of loading stability, the mountain portions 111a and valley portions 111b in each corrugated plate-shaped placing portion 111 are preferably formed at three or more locations, more preferably four or more locations, even more preferably six or more locations, and even more preferably eight or more locations, respectively. There is no particular upper limit to the number of the mountain portions 111a and valley portions 111b in each corrugated plate-shaped placing portion 111, but considering the stability of loading, they are preferably formed at twelve or less locations, more preferably ten or less locations, even more preferably eight or less locations, respectively.

Figure 5:
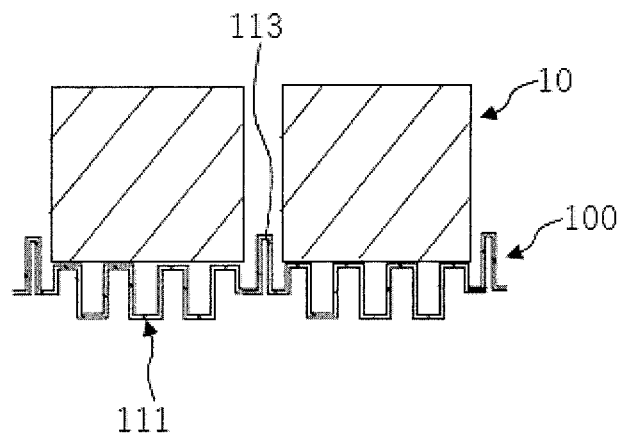
FIG. 5 is a schematic end view corresponding to the observation direction of FIG. 4B of a state in which the prismatic honeycomb structures are placed on a tray according to one embodiment of the present invention so that the width direction of the intervening wall and the longitudinal direction of the prismatic honeycomb structure coincide with each other, when the advancing direction of the wave in the corrugated plate-shaped placing portion is parallel to the thickness direction of the intervening wall.

The advancing direction of the wave in each corrugated plate-shaped placing portion 111 (direction in which the mountain portions and valley portions are repeated) is not particularly limited. For example, in the tray 100 according to the present embodiment, the advancing direction of the wave in the corrugated plate-shaped placing portion 111 is parallel to the width direction of the intervening wall 113. Alternatively, the advancing direction of the wave in the corrugated plate-shaped placing portion 111 can be parallel to the thickness direction of the intervening wall 113. FIG. 5 shows a schematic end view corresponding to the observation direction of FIG. 4b of a state in which the prismatic honeycomb structures 10 are placed on the tray so that the width direction of the intervening wall 113 and the longitudinal direction of the prismatic honeycomb structure coincide with each other, when the advancing direction of the wave in the corrugated plate-shaped placing portion 111 is parallel to the thickness direction of the intervening wall 113. In addition, the advancing direction of the wave in the corrugated plate-shaped placing portion 111 may be oblique to the width direction of the intervening wall 113.

The material of the tray 100 is not particularly limited, but it is desirable that the tray 100 have enough strength to withstand the load when a plurality of prismatic honeycomb structures 10 are stacked. The tray 100 can be made of plastic, metal, paper (corrugated cardboard), or the like. More specifically, it can contain at least one material selected from polypropylene, polyethylene, polyethylene terephthalate, vinyl chloride, iron, aluminum, and paper.

In addition, in order to prevent the end surfaces of the adjacent prismatic honeycomb structures from coming into contact with each other, intervening walls may be erected between the adjacent corrugated plate-shaped placing portions.

3. Package According to Embodiments of the Present Invention

Figure 6:
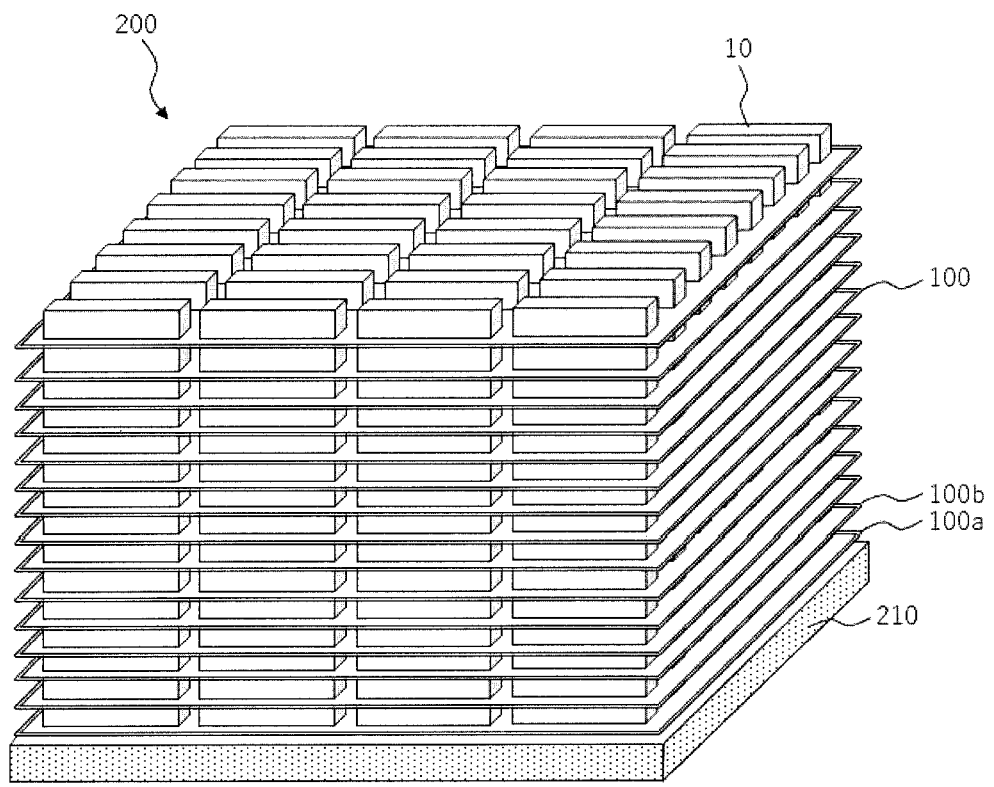
FIG. 6 is a perspective view of a package 200 of prismatic honeycomb structures 10 using trays according to one embodiment of the present invention.

FIG. 6 schematically shows a perspective view of the package 200 of the prismatic honeycomb structures 10 using the tray according to one embodiment of the present invention. The package 200 comprises a first array of a plurality of the prismatic honeycomb structures 10 placed on top of a first tray 100a according to one embodiment of the present invention; a second tray 100b according to one embodiment of the present invention placed on top of the first array; and a second array of a plurality of prismatic honeycomb structures placed on top of the second tray.

Figure 7:
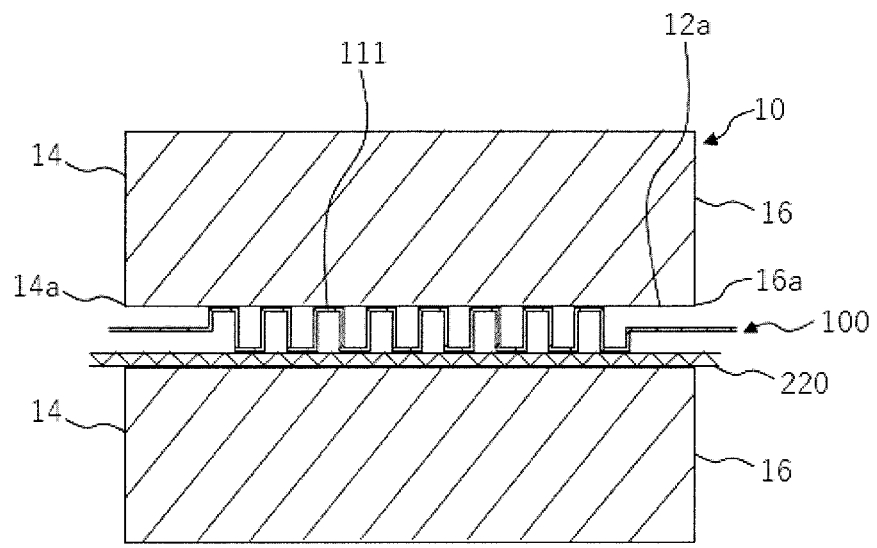
FIG. 7 is a schematic end view corresponding to the observation direction of FIG. 4A of a state in which the prismatic honeycomb structures are placed on the tray so that the width direction of the intervening wall and the longitudinal direction of the prismatic honeycomb structure coincide with each other, with a cushion sandwiched between the prismatic honeycomb structures and the tray.

When a plurality of prismatic honeycomb structures is stacked via the tray, the prismatic honeycomb structures placed on the tray may be placed directly on the tray, but for the purpose of reducing the load upon stacking, a cushion may be sandwiched between the prismatic honeycomb structures and the tray. FIG. 7 shows a schematic end view corresponding to the observation direction of FIG. 4A of a state in which the prismatic honeycomb structures 10 are placed on the tray 100 so that the width direction of the intervening wall 113 and the longitudinal direction of the prismatic honeycomb structure 10 coincide with each other, with a cushion 220 sandwiched between the prismatic honeycomb structures 10 and the tray 100.

The material of the cushion is not particularly limited, but a synthetic resin can be used as the material, and can be provided in the form of, for example, a bubble wrap, a foamed resin plate, a rubber sheet, or the like. Examples of the synthetic resin include polyethylene, polypropylene, polystyrene, polyurethane, phenol resin, polyvinyl chloride resin, urea resin, silicone resin, and melamine resin. As the synthetic resin, one of the above types may be used alone, or two or more types may be used in combination. A foamed resin can also be used as the resin.

Likewise, the prismatic honeycomb structures 10 can be repeatedly stacked with the tray according to one embodiment of the present invention interposed therebetween. The number of stages of the prismatic honeycomb structures 10 is not limited and may be appropriately set in consideration of the strength of the tray and the strength of the prismatic honeycomb structures 10, but may be, for example, 8 to 24. A pallet 210 may be placed under the first tray 100a to facilitate the transport operation.

4. Stacking Method of Prismatic Honeycomb Structures According to a Comparative Example Hereinafter, a stacking method of prismatic honeycomb structures according to a Comparative Example will be briefly described. Repeated description on the reference numerals the same as the reference numerals already described will be omitted.

Figure 8:
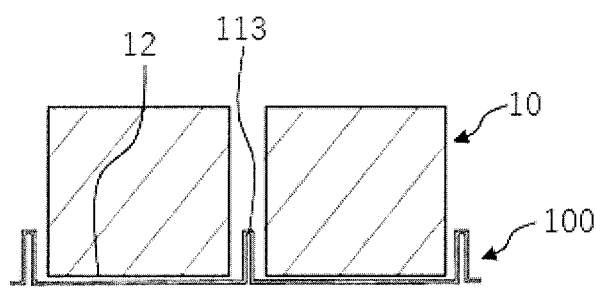
FIG. 8 is a schematic end view corresponding to the observation direction of FIG. 4B of a tray according to a Comparative Example in which placing portions in contact with the outer peripheral side surface of the prismatic honeycomb structures is flat plate-shaped, and only corrugated intervening walls are provided.

FIG. 8 shows a schematic end view corresponding to the observation direction of FIG. 4b of a tray according to a Comparative Example in which placing portions in contact with the outer peripheral side surface 12 of the prismatic honeycomb structures 10 is flat, and only intervening walls 113 are provided. When the prismatic honeycomb structure 10 is placed on the tray shown in FIG. 8, the edges 14a and 16a forming the contours of the end surfaces 14 and 16 of the prismatic honeycomb structure 10 are loaded from the tray 100. Therefore, when the prismatic honeycomb structures are stacked in multiple stages via the tray 100, the prismatic honeycomb structures may be easily damaged.

Figure 9A:
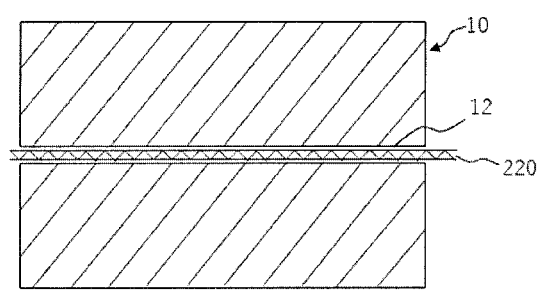
FIGS. 9A, 9B and 9C are schematic end views observed from the direction corresponding to the observation direction of FIG. 4A when prismatic honeycomb structures are stacked using the trays according to Comparative Examples.

FIG. 9A shows a schematic end view observed from the direction corresponding to the observation direction of FIG. 4A when the prismatic honeycomb structures 10 are simply stacked with the cushion 220 interposed therebetween without using a tray. Since the cushion alone is too soft and the prismatic honeycomb structures 10 tend to tilt when placed, a support material is required, and the prismatic honeycomb structures 10 is likely to move during the transportation due to the absence of the intervening wall, and thus easy to collide with each other.

Figure 9B:
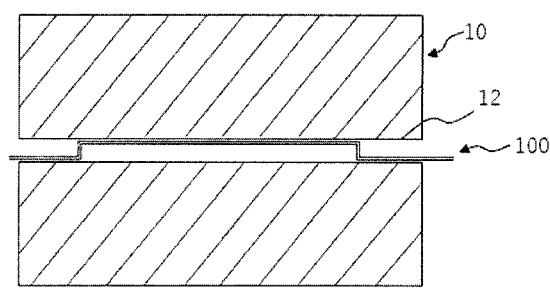

FIG. 9B shows a schematic end view observed from a direction orthogonal to the longitudinal direction of the prismatic honeycomb structures 10 when the prismatic honeycomb structures 10 are stacked with the tray 100 interposed therebetween, the tray 100 having placing portions protruding upward in contact with the outer peripheral side surface 12 of the prismatic honeycomb structure 10. According to the tray 100, the edges 14a and 16a of the prismatic honeycomb structures 10 placed on the tray 100 are separated from the tray 100, so that no load is applied. However, for the lower prismatic honeycomb structure 10 on the lower side on which the tray 100 is placed, the placed edge portions 14a and 16a are loaded from the tray 100. Therefore, it is disadvantageous for stacking the prismatic honeycomb structures 10 in multiple stages via the tray 100.

Figure 9C:
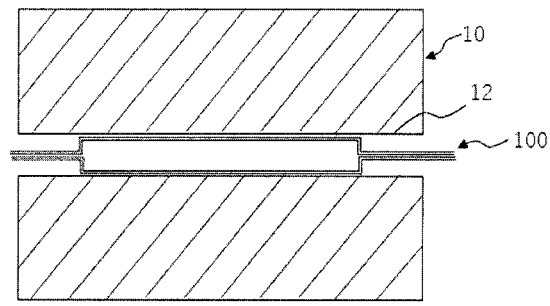
Figure 10:
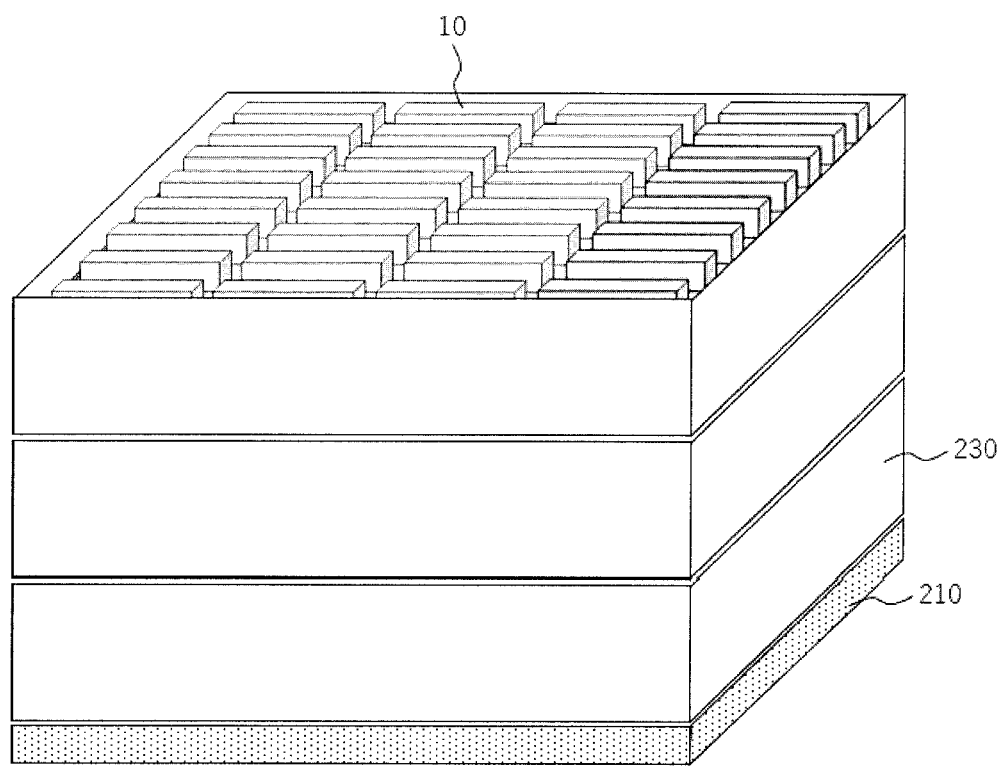
FIG. 10 is a schematic perspective view of a package according to a Comparative Example.

Accordingly, as shown in FIG. 9C, a method of stacking the prismatic honeycomb structures 10 by stacking two trays 100 upside down is conceivable, but since the number of trays 100 is doubled, the practicality is low.

DESCRIPTION OF REFERENCE NUMERALS

10 Prismatic honeycomb structure
11a First cell
11b Second cell
12 Outer peripheral side surface
12a Corner portion
14 First end surface
14a Edge
16 Second end surface
16a Edge
18 Partition wall
100 (100a, 100b) Tray
110 Plate-shaped portion
111 Corrugated plate-shaped placing portion
111a Mountain portion
111b Valley portion
112 Flat plate-shaped non-placing portion
112a Upper surface of flat plate-shaped non-placing portion
112b Lower surface of flat plate-shaped non-placing portion
113 Intervening wall
114 Groove
200 Package
210 Palette
220 Cushion
230 Container box

The invention claimed is:

1. A tray comprising a plate-shaped portion for arranging a plurality of prismatic honeycomb structures having an outer peripheral side surface and partition walls provided on an inner peripheral side of the outer peripheral side surface, the partition walls partitioning a plurality of cells forming flow paths from a first end surface to a second end surface, the plate-shaped portion comprising:
a plurality of corrugated plate-shaped placing portions for placing the prismatic honeycomb structures with the outer peripheral side surface in contact with the placing portions;
flat plate-shaped non-placing portions adjacent to each of the corrugated plate-shaped placing portions; and
intervening walls erected between adjacent corrugated plate-shaped placing portions to prevent the outer peripheral side surfaces of adjacent prismatic honeycomb structures from contacting each other;
wherein each of the corrugated plate-shaped placing portions comprises a plurality of mountain portions protruding above an upper surface of the adjacent flat plate-shaped non-placing portion and a plurality of valley portions protruding below a lower surface of the adjacent flat plate-shaped non-placing portion, alternately, and
a length between both ends of the mountain portions of each corrugated plate-shaped placing portion in a width direction of the intervening wall is shorter than a distance from the first end surface to the second end surface of the prismatic honeycomb structure, and a length between both ends of the valley portions of each corrugated plate-shaped placing portion in the width direction of the intervening wall is shorter than the distance between the first end surface to the second end surface of the prismatic honeycomb structure.

2. The tray according to claim 1, wherein the length between the both ends of the mountain portions of each corrugated plate-shaped placing portion in the width direction of the intervening wall is 50% to 95% with respect to the distance from the first end surface to the second end surface of the prismatic honeycomb structure.

3. The tray according to claim 1, wherein the length between the both ends of the valley portions of each corrugated plate-shaped placing portion in the width direction of the intervening wall is 50% to 95% with respect to the distance from the first end surface to the second end surface of the prismatic honeycomb structure.

4. The tray according to claim 1, wherein each corrugated plate-shaped placing portion has a rectangular wave cross-section.

5. The tray according to claim 1, wherein a height of the mountain portion with respect to the upper surface of the flat plate-shaped non-placing portion is lower than a height of the intervening wall with respect to the upper surface of the flat plate-shaped non-placing portion.

6. The tray according to claim 1 comprising at least one material selected from polypropylene, polyethylene, polyethylene terephthalate, vinyl chloride, iron, aluminum, and paper.

7. The tray according to claim 1, wherein in each corrugated plate-shaped placing portion, a height of the mountain portion with respect to the upper surface of the adjacent flat plate-shaped non-placing portion and a depth of the valley portion with respect to the lower surface of the adjacent flat plate-shaped non-placing portion are the same.

8. A package of prismatic honeycomb structures, comprising
a first array of a plurality of prismatic honeycomb structures placed on top of a first tray;
a second tray placed on top of the first array; and
a second array of a plurality of prismatic honeycomb structures placed on top of the second tray;
wherein the first tray and the second try are the tray according to claim 1, respectively.

9. The package of prismatic honeycomb structures according to claim 8, comprising a pallet placed under the first tray.

10. The package of prismatic honeycomb structures according to claim 8, comprising a cushion sandwiched between the first array and the second tray.

* * * * *